Figure 1:
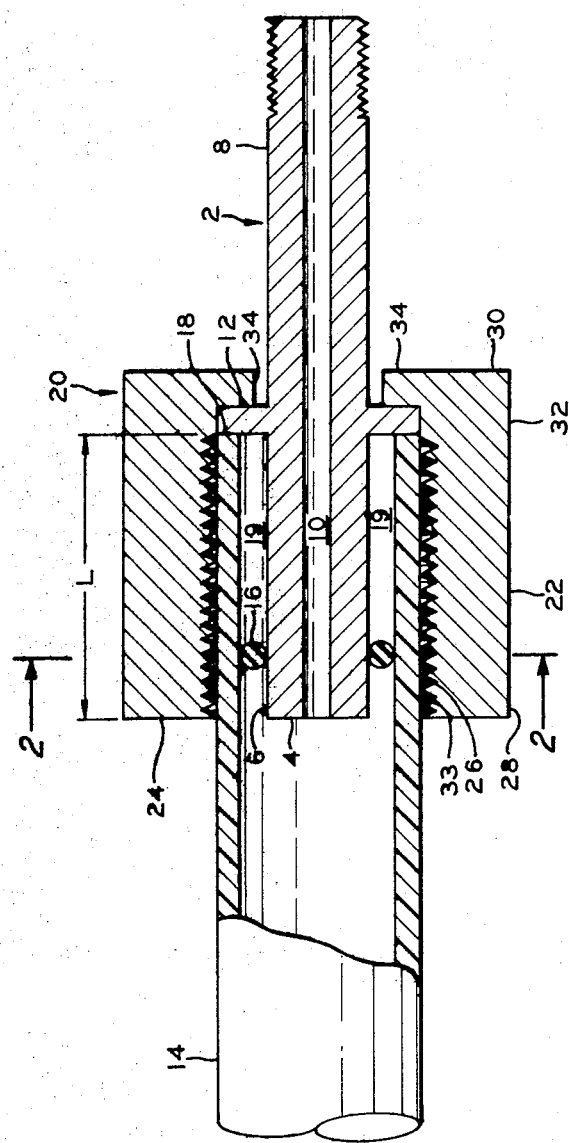

United States Patent [19]
Windle

[11] 3,709,260
[45] Jan. 9, 1973

[54] APPARATUS FOR TESTING CONDUIT
[75] Inventor: Tom J. Windle, Bartlesville, Okla. 74004
[73] Assignee: Phillips Petroleum Co.
[22] Filed: April 12, 1971
[21] Appl. No.: 133,166

[52] U.S. Cl. .................138/90, 285/114, 285/320, 285/338
[51] Int. Cl. ..........................F16l 55/10, F16l 47/00
[58] Field of Search..........285/338, 196, 346, 8, 373, 285/114; 138/90

[56] References Cited

UNITED STATES PATENTS

| 2,621,679 | 12/1952 | Tuttle | 138/90 |
| 3,421,782 | 1/1969 | Kalish et al. | 285/338 X |
| 3,326,243 | 6/1969 | Augustus | 138/90 |
| 2,886,067 | 5/1959 | Maxwell et al. | 138/90 |
| 1,822,444 | 9/1931 | MacClatchie | 285/338 X |
| 2,855,003 | 10/1958 | Thaxton | 138/90 |

Primary Examiner—Thomas F. Callaghan
Attorney—Young & Quigg

[57] ABSTRACT

An apparatus for passing fluid into a conduit for pressure testing said conduit. In one embodiment, a portion of a mandrel is maintained in sealable engagement within the conduit by a clamp that has pivotal portions for attachment and release of the clamp and, in another embodiment, a seal between the mandrel and the conduit is provided by compressing a resilient member of the mandrel.

3 Claims, 2 Drawing Figures

PATENTED JAN 9 1973

3,709,260

SHEET 1 OF 2

INVENTOR.
T. J. WINDLE

ATTORNEYS

APPARATUS FOR TESTING CONDUIT

It is desired to provide apparatus utilized for pressurizing conduit for pressure testing said conduit. One example would be in the manufacture of plastic conduit for quality checking the burst pressure of selected lengths of the conduit. In such a situation, it is often necessary to pressure check hundreds of the conduits per day. It then becomes advantageous to provide apparatus that is easily installed and removed and will effectively seal an end of the conduit and provide for the passage of fluid into said conduit.

This invention therefore resides in an apparatus for passing fluid into a conduit for pressure testing said conduit. In one embodiment, a portion of a mandrel is maintained in sealable engagement within the conduit by a clamp that is pivotally movable for attachment to and release from the conduit and, in another embodiment, a seal between the mandrel and the conduit is formed by compressing a resilient member of the mandrel.

Other aspects, objects, and advantages of the present invention will become apparent from a study of the disclosure, the appended claims, and the drawing.

Figure 2:
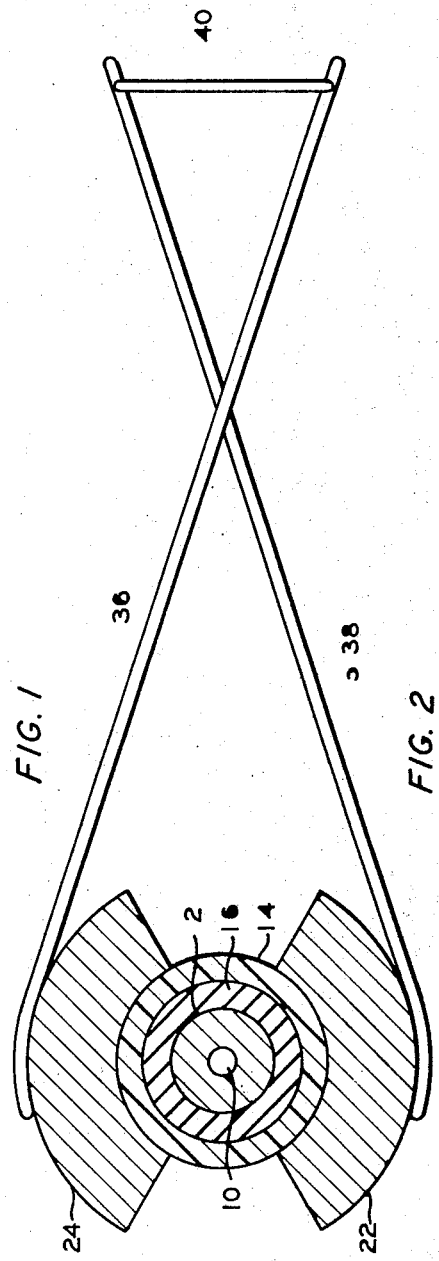
Figure 5:
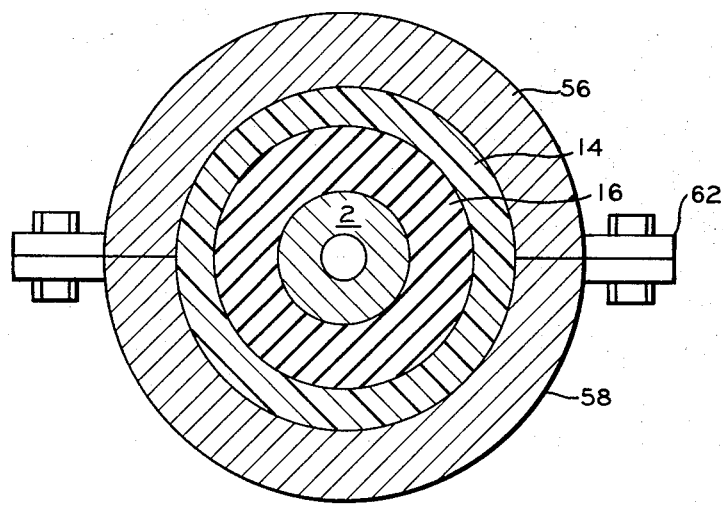
Figure 4:
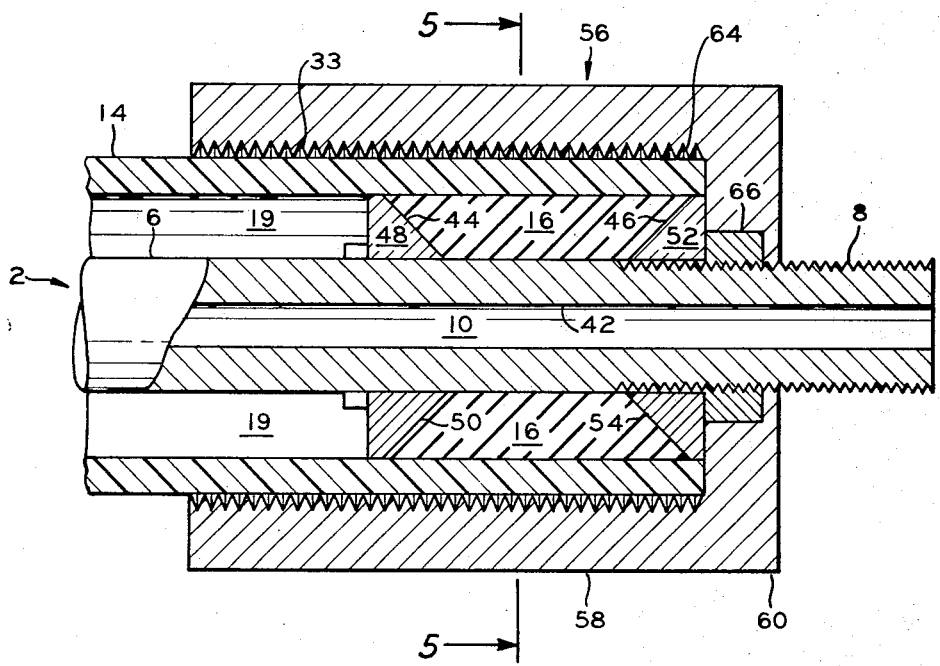
Figure 3:
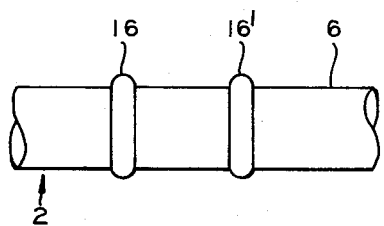

The drawings are diagrammatic views of the apparatus of this invention. FIG. 1 is a partial sectional view of one embodiment of the apparatus; FIG. 2 is a sectional view taken along line 2—2 of FIG. 1; FIG. 3 is a view of a plurality of annular resilient members mounted on the mandrel; FIG. 4 is a partial sectional view of another embodiment of the apparatus; and FIG. 5 is a sectional view taken along line 4—4 of FIG. 4.

Referring to FIG. 1, a mandrel 2 of the apparatus of this invention has a first end 4, first and second end portions 6, 8, a chamber 10 extending therethrough, and an annular flange 12 spaced a distance along the mandrel 2 from the first end 4 thereof. The flange 12 of the mandrel 2 is of at least greater diameter than the inside diameter of a conduit 14 that is to be tested by the apparatus of this invention.

The first end portion 6 of the mandrel 2 extends from the flange 12 of the mandrel 2 to the first end 4 of said mandrel 2. The first end portion 6 of the mandrel 2 is of smaller diameter than the inside diameter of the conduit 14 for insertion of said first end portion into the conduit 14 during pressure testing operations. The first end portion 6 of the mandrel 2 also has at least one resilient annular member 16 installed therein and thereabout that is substantially equal to or larger than the inside diameter of the conduit 14. That annular member 16 must now, however, be so large that the mandrel 2 cannot be inserted into the conduit 14 or is inserted with difficulty. An example of such a resilient annular member is commonly called an O-ring. Where O-rings are utilized, the dimensions and resiliency necessary for proper sealing can be easily calculated and selected by one skilled in the art. In the inserted position of the mandrel 2 within the conduit 14, the flange 12 of the mandrel 2 is abutting end 18 of the conduit 14 and the annular member 16 is sealing the annulus 19 formed between the conduit 14 and the mandrel 2 as shown in FIG. 2.

A removable clamp 20 is provided for maintaining the first end portion 6 of the mandrel 2 within the conduit 14 during passage of fluid through the mandrel 2 and into the conduit 14 for pressure testing said conduit. During pressure testing, the other end of the conduit 14 is sealed by any means known in the art. Where extremely long lengths of conduit and/or extremely large diameter conduits are being tested, both ends of the conduit can be provided with the apparatus of this invention to increase the speed of filling and pressure testing said conduit.

The preferred removable clamp 20, as shown in FIGS. 1 and 2, has opposed first and second portions 22, 24 pivotally connected one to the other with each portion 22 and 24 having an inner surface 26. The inner surface 26 of each portion 22, 24 of the clamp 20 has first and second end portions 28, 30 and a middle portion 32.

The first end portion 28 of the inner surface 26 of each clamp portion 22, 24 is of arcuate configuration and has a length (L) at least greater than the distance from the resilient annular member 16 to the flange 12 of the mandrel 2. The middle portion 32 of each clamp portion 22, 24 has a length at least equal to the width of the flange 12 of the mandrel 2. The second end portion 28 of each clamp portion 22, 24 has an inwardly extending flange 34 of dimensions sufficient for engaging the upstream side of the flange 12 of the mandrel 2 in the installed position.

In order to provide for increased resistance against movement of the clamp 20 relative to the conduit 14 during testing of the conduit 14, it is preferred that the inner surface 26 of the first end portion 28 of each clamp portion 22, 24 be serrated or have protrusions 33 formed thereon. These protrusions 33 are particularly useful for preventing relative movement where high testing pressures are to be utilized.

The first and second clamp portions 22, 24 are pivotally movable between the first position (not shown) at which the inner surface 26 of each clamp portion 22, 24 is spaced from the conduit 14 and the mandrel 2 for inserting into and removing the mandrel 2 from the conduit 14, and a second position at which the inner surface first end portion 28 of the clamp portions 22, 24 are in contact with the conduit 14 and forcefully urging and deforming said conduit 14 against the annular member 16 of the mandrel 2 and being in contact with the flange 12 of the mandrel 2.

Referring to FIG. 2, first and second members 36, 38 are each fixedly attached at an end to a separate one of the clamp portions 22, 24. The members extend laterally from said members 26, 28 and are pivotally connected one to the other for pivotally connecting the clamp portions 22, 24 for pivotal movement of one relative to the other. A locking member 40, such as a bar releasably hooked into openings formed through the members 36, 38 can be provided for maintaining the clamp portions 22, 24 at their second position. Other locking means known in the art can be so utilized, such as, for example, the members 36 and 38 of the handle portion of the tool commonly referred to as vise grip pliers.

It is preferred in the apparatus shown in FIGS. 1 and 2, that the flange 34 of each of the second end portions 28, 30 in the installed position are each in contact with the flange 12 and spaced from the second end portion 8 of the mandrel for better gripping and maintaining the mandrel 2 properly positioned during pressure testing operations. It is also preferred that the inner surface first end portion 28 of each clamp portion 22, 24 at the second position of the clamp 20 be in contact with the outer surface of the conduit 14 through an arc of at least 120° about said conduit 14.

Referring to FIG. 3, where high testing pressures are utilized, a plurality of resilient annular members 16, 16' spaced one from the other can be provided on the first end portion 6 of the mandrel 2 for more effectively seating the annulus 19.

The flange 12 of the mandrel 2 of FIGS. 1 and 2 can be of greater diameter than the outside diameter of the conduit 14, but for ease in construction, it is preferred that said flange 12 be substantially equal to said conduit diameter. The arcuate configuration of the inner surface first end portion 28 of each clamp portion 22, 24 is also preferably matable with the configuration of the conduit.

FIG. 3 shows another embodiment of an annular member that has been found particularly useful for testing conduits 14 having an inside diameter of about 2 inches or larger.

FIG. 4 shows another embodiment of an annular member and manual assembly that has been found particularly useful for testing conduits having an inside diameter of about 2 inches or larger. In this embodiment, the mandrel 2 has first and second end portions 6, 8, a middle portion 42 and a chamber 10 extending therethrough. A compressible annular member 16 is slidably mounted on the middle portion 42 of the mandrel 2. That annular member 16 has a diameter substantially equal to the inside diameter of the conduit and has an opening extending therethrough, as described above with reference to FIG. 1. At least the first and preferably the first and second ends 44, 46 of the annular member 16 are of concave configuration preferably extending outwardly from the mandrel at an angle in the range of about 30°-60° relative to an axis of the mandrel. At angles less than 30° portions of the end of the mandrel member 16 are excessively thin and more easily damaged during use thereof and at angles greater than about 60° the annular member sometimes does not form an effective seal in the annulus between the annular member 16 and the mandrel 2.

A stop ring 48 is fixedly attached about the mandrel 2 at the first end portion 6 thereof. The stop ring 48 has a diameter substantially equal to the diameter of the compressible annular member 16 and a first end portion 50 that is matable with the first end 44 of the annular member 16 for sealing the annulus between the mandrel 2 and the annular member 16.

A slidable ring 52 is slidably mounted about the mandrel 2 at the second end portion 6 thereof. The slidable ring 52 has a first end portion 54 that is matable with the second end 46 of the compressible annular member 16 and is of a diameter substantially equal to the diameter of said annular member 16. Although the first end portion 54 of the slidable ring and the second end 46 of the annular member 16 can be of various matable configurations, it is preferred that they are constructed similar to the first end portion 50 of the stop ring and associated first end 44 of the annular member 16 in order to assure against the leakage of fluid between the mandrel 2 and the annular member 16. In order to assure effective sealing of the annulus 19, it is preferred that the length of the compressible annular member 16 be at least as large as the inside diameter of the conduit 14 and that said annular member be formed of rubber.

A clamping means is provided for maintaining a portion of the mandrel 2 and the associated annular member 16 within the conduit 14 and preventing enlargement of the conduit 14 adjacent the annular member 16. The clamping means is releasable for removal of the mandrel 2 from the conduit 14. That clamping means can be similar to the structure shown and described with reference to FIGS. 1 and 2 or can be of different construction.

Referring to FIG. 5, a clamp 56 has first and second portions 58, 60 that encompass the conduit 14 as described with reference to clamp 20. With conduit having an inside diameter in excess of about 2 inches, it is preferred that the clamp have flanges 62 that are releasably connectable for providing a more rigid assembly. Where high pressures are utilized during the testing operations, it is also preferred that the portion of the inner surface 26 of the clamp 56 in contact with the conduit 14 have protrusions formed thereon for increasing the gripping force of the clamp 56.

A compressing means 66 such as, for example, a threaded structure matable with threads formed on the second end portion 8 of the mandrel 2 is provided for moving the slidable ring 52 and the second end 46 of the compressible annular member 16 toward the stop ring 48 for compressing said annular member 16 and sealing the annulus 19 formed between the conduit 14 and the annular member 16 and the annulus formed between the annular member 19 and the mandrel 2.

In the operation of the apparatus of this invention, one end of the conduit 14 is sealed to prevent fluid escape therefrom and the first end portion of the mandrel 2 is inserted within the other end of the conduit 14 with the flange 12 of the mandrel 2 abutting the end of the conduit 14. A clamp 20 or 56 is then installed over the end of the conduit adjacent the first end portion 6 of the mandrel with the flange 34 of the clamp 20 or 56 positioned upstream from the flange 12 of the mandrel 2. Fluid from a pressure source (not shown) is then delivered through the mandrel and into the conduit 14 for pressure testing said conduit 14. In the embodiment shown in FIG. 1, the pressure of the clamp 20 about the conduit 14 deforms the conduit into sealing engagement with the annular resilient member 16 for effectively sealing the annulus formed between the mandrel 2 and the conduit 14.

In the embodiment shown in FIG. 1, the mandrel 2 and associated annular member 16 and rings 48, 52 are inserted within the conduit 16, the clamp 20 or 56 is secured about the conduit 16 and the mandrel 2 therein and the compressing means 66 is actuated manually, for example, to urge the slidable ring 52 and the second end 46 of the compressible annular member 16 toward the stop ring 48. As the annular member 16 is compressed by this relative movement, said member 16 deforms and effectively seals the annulus between the mandrel 2 and the conduit 14. After testing, the slidable ring 52 is moved in the opposite direction for removal of the mandrel from the conduit.

In the sealed condition of the conduit with the apparatus of this invention, conduit can be effectively pressure tested. Owing to the construction of the apparatus, the set up and take down time of the testing equipment is significantly reduced relative to heretofore utilized pressure testing apparatus.

Other modifications and alterations of this invention will become apparent to those skilled in the art from the foregoing discussion and accompanying drawing, and it should be understood that this invention is not to be unduly limited thereto.

What is claimed is:

1. An apparatus for passing fluid into a plastic conduit for pressure testing said conduit, comprising:

a mandrel having first and second end portions, a middle portion, and a chamber extending therethrough;

a compressible annular member having a diameter substantially equal to the inside diameter of the conduit, an opening extending therethrough, and first and second ends with said ends being of concave configuration and with said annular member being slidably mounted on the middle portion of the mandrel;

a stop ring having a diameter substantially equal to the diameter of the compressible annular member, a first end portion matable with the first end of the annular member, and being fixedly attached to the mandrel at the first end portion thereof;

a slidable ring having a diameter substantially equal to the diameter of the compressible annular member, a first end portion matable with the second end of the annular member and being slidably mounted about the mandrel at the second end portion thereof;

compressing means for moving the slidable ring and the second end of the compressible annular member toward the stop ring for compressing said annular member and sealing the annulus formed between the conduit and the annular member;

a removable annular clamping element having opposed first and second segmental portions with each portion having an inner surface of common arcuate configuration with the arc of each having a diameter greater than about 2 inches, said first and second clamp portions each having a length at least greater than the compressible annular member and a flange fixedly attached on opposed sides with openings formed through said flanges; and means associated with the flange openings for urging the flanges on common sides of the clamping element toward one another and the inner surface of the clamping element into forcible contact with the outer surface of the plastic conduit for preventing enlargement of said plastic conduit outer surface during pressure testing thereof.

2. An apparatus, as set forth in claim 1, wherein each concave portion of the compressible annular member extends outwardly from the mandrel at an angle in the range of about 30°-60° relative thereto.

3. An apparatus for passing fluid into a plastic conduit having an inside diameter greater than about 2 inches for pressure testing said conduit, comprising:

a mandrel of generally cylindrical configuration having first and second end portions, a middle portion, and a chamber extending therethrough with said second end portion having threads formed thereon;

a compressible annular member having an outer diameter substantially equal to the inside diameter of the plastic conduit upon which utilized, a hole extending therethrough, said hole being of a diameter larger than the outer diameter of the mandrel, and first and second ends each of concave configuration with each concave portion extending outwardly from the mandrel at an angle in the range of about 30°-60° relative to the mandrel and said compressible annular member being slidably mounted on said mandrel;

a stop ring having a diameter substantially equal to the diameter of the compressible annular member in an uncompressed condition thereof, a first end portion matable with the first end of the compressible annular member and being fixedly attached to the mandrel at the first end portion thereof;

a slidable ring having a diameter substantially equal to the diameter of the compressible annular member in an uncompressed condition thereof, a first end portion matable with the second end of the compressible annular member and being slidably mounted about the mandrel at the second end portion thereof;

compressing means matable with the threads of the mandrel for moving the slidable ring and the second end of the compressible annular member in a direction toward the stop ring for compressing said annular member between said stop ring and said slidable ring for sealing an annulus formed between the plastic conduit and the compressible annular member during pressure testing of the plastic conduit and in a direction from the stop ring for removing compression forces from the compressible annular member for moving the mandrel relative to the plastic conduit;

a removable clamping element having opposed first and second segmental portions with each portion having an inner surface of common arcuate generally semicircular configuration with the arc of each having a diameter greater than about 2 inches, said first and second clamp portions each having a length at least greater than the length of the compressible annular member and separate flanges fixedly attached on opposed sides of each clamping portion with said flanges having openings formed therethrough with the flange openings of the first clamping portion being generally coaxial with flange openings of the second clamping portion in the installed position on the plastic conduit; and means associated with the flange openings for urging the flanges of the clamping portions toward one another and the arcuate surface of the clamping portions into forcible contact with the outer surface of the plastic conduit for preventing enlargement of said plastic conduit outer surface during pressure testing thereof.

* * * * *